Patented Jan. 29, 1935

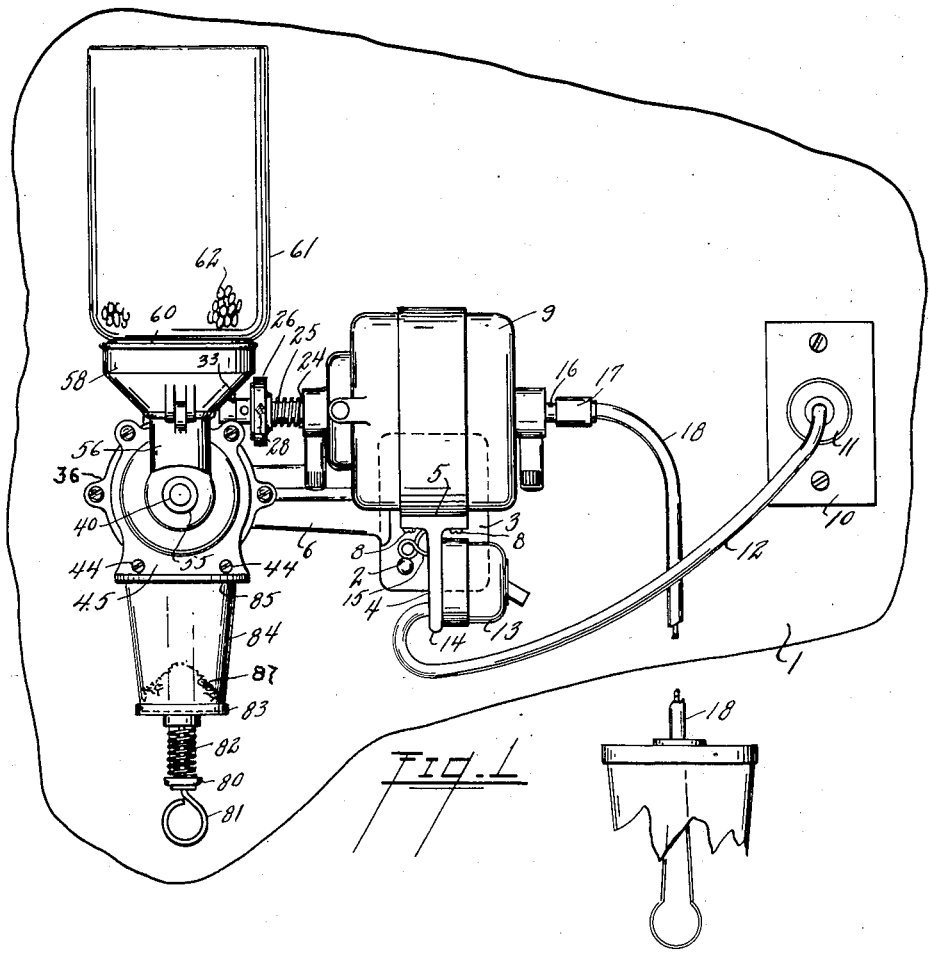

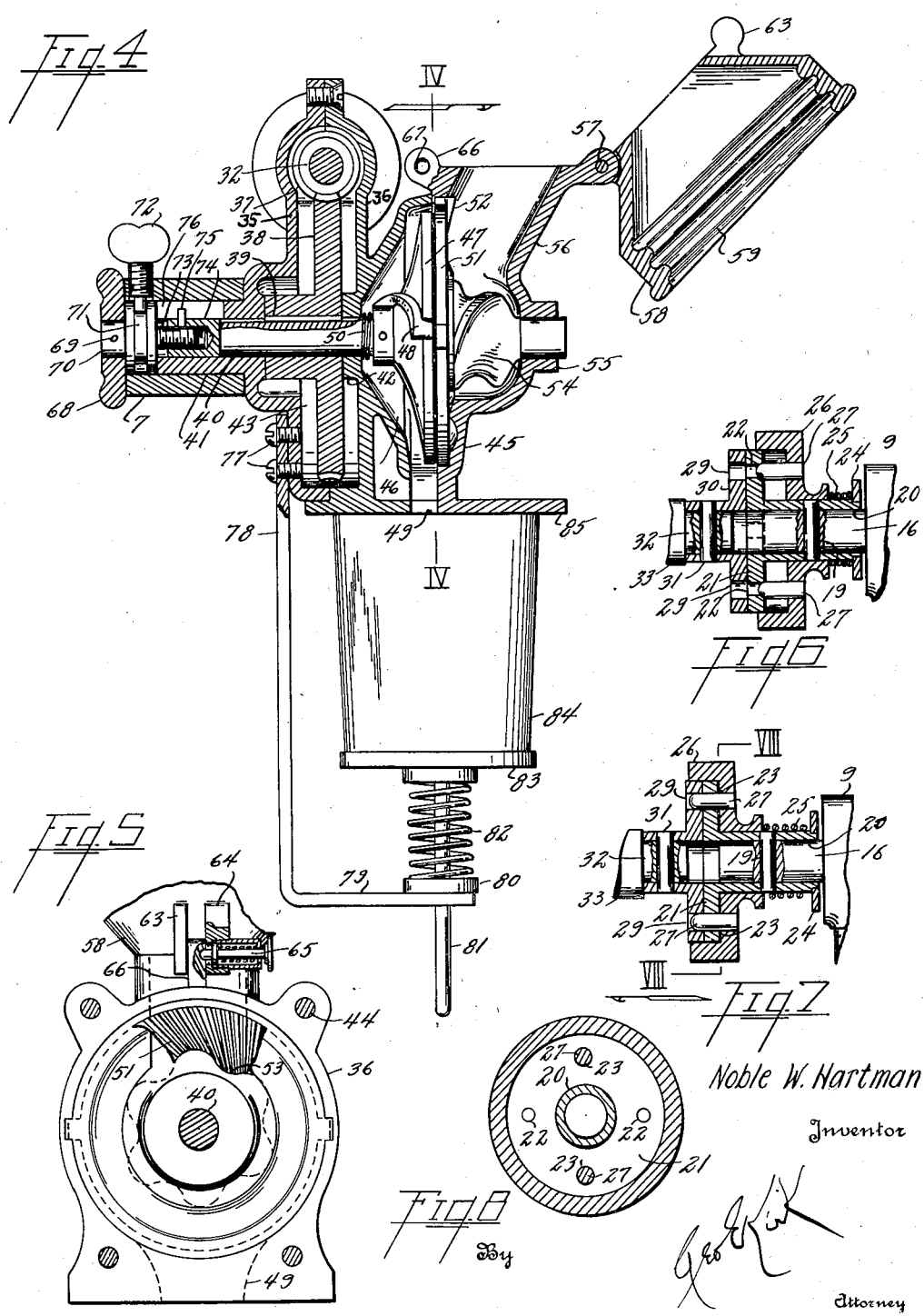

1,989,415

UNITED STATES PATENT OFFICE 1,989,415

MILL HOPPER

Noble W. Hartman, Toledo, Ohio, assignor, by mesne assignments, of one-half to Daisey E. W. Bay, Toledo, Ohio Application April 21, 1931, Serial No. 531,741

1 Claim. (Cl. 83—18)

This invention relates to power types of kitchen utensils.

This invention has utility when incorporated in electric motor drives for effecting rotation in mills, beaters and analogous kitchen equipment uses.

Referring to the drawings:

Fig. 1 is a front elevation of an embodiment of the invention, including a coffee mill;

Fig. 2 is a plan view of the mill of Fig. 1, parts being broken away;

Fig. 3 is a fragmentary view from the left of Fig. 1;

Fig. 4 is a view on the line IV—IV, Fig. 2, looking in the direction of the arrow;

Fig. 5 is a section, partly on the line V—V, Fig. 4, looking in the direction of the arrow;

Fig. 6 is a section on the line VI—VI, Fig. 2, showing the clutch in disconnected position;

Fig. 7 is a view similar to Fig. 6, with the clutch in transmitting position; and Fig. 8 is a section on the line VIII—VIII, Fig. 7 looking in the direction of the arrow.

Upon wall 1, screws 2 serve to anchor plate 3 of bracket unit having arm 4 to base 5, and arm 6 to sleeve or bearing 7. Bolts 8 at the seat 5 mount electric motor 9 in fixed position with the bracket unit. At wall plate 10 is electric outlet fitting 11 from which extends flexible conduit 12 with pair of electric current supply lines to electric switch 13 on bracket unit flange 14 below the seat or base 5. Electric conductor lines 15 from the switch 13 to the motor 9 complete the control connections therefor. The motor may thus be readily started and stopped.

The motor 9 has shaft 16 having terminal fitting 17 for flexible shaft 18 for driving beater, stirrer, or such rotary tool attachment as may be selected.

The shaft 16 of the motor as extending in the direction of the extent of the arm 6, has fixed thereon by pin 19 (Figs. 6, 7), sleeve 20 terminating in disk 21 having pair of diametrical minor openings or seats 22 and at right angles thereto pair of major openings or seats 23. The sleeve 20, toward the motor 9, terminates in collar 24 against which abuts helical compression spring 25 normally yieldably thrusting cup 26 toward the disk 21 to thrust pair of diametrical pins 27 into a pair of openings in the disk 21. With such pins 27 lodging in the minor openings 22 as seats, the spring 25 holds this connector device for the clutch in locked out position. By grasping the knurled overhang 28 of this connector and thrusting the cup 26 toward the motor 9 to free the pins 27 from the seats 22, the cup 26 may then be allowed to settle back as urged by the spring 25 to thrust the pins through the openings 23 to have their tapered termini ride into a pair of openings 29 of companion clutch disk 30 anchored by pin 31 with follower shaft 32. Throwing in of this clutch takes up the working looseness of the shaft 32 in its bearings 33, 34, in housing sections 35, 36.

On the shaft 32 in this housing is worm 37 in the speed reduction transmission from the motor 9 to worm wheel 38 having spline connection 39 with shaft 40 in bearing 41 in the housing section 35, and in bearing 42 in the housing section 36. These housing sections 35, 36, provide chamber 43 in which the steel worm wheel 38 runs dry as driven by the bronze worm 37.

Bolts 44 assemble supplemental housing section 45 with the section 36 in providing chamber 46 into which the shaft 40 extends to have fixed thereon rotary burr 47 of this family coffee mill. Spiral deflector 48 on the back of this grinding disk 47, directs flow of any material away from the mill in the chamber 46 toward discharge port 49.

Helical compression spring 50 about the shaft 40 in the chamber 46, tends to urge the grinding burr disk 47 toward opposing burr disk 51, having keying extension means 52 coacting with the housing section 45 for loosely holding this second grinding member.

The shaft 40 has extension through opening 53 centrally of the disk 51 to carry scroll conveyor portion 54 and then terminate in bearing 55. This scroll 54 is in the bottom of hopper 56. Bearing 57 near the upper portion of this hopper 56 provides a hinge mounting for hopper extension 58 having a flare main body portion terminating in a threaded seat 59 to engage with threaded neck 60 of Mason type glass fruit jar 61. This jar, as a reserve supply, may be filled with roasted coffee beans 62, gravity retained therein when the hopper extension section is swung over as shown in Fig. 4 for assembly of a full jar, or supply of material into the empty jar. The full jar may then be swung to upright position, and gravity flow of beans therefrom is into the main hopper 56. Ear 63 (Figs. 4, 5) on this hopper extension 58 is adjacent companion ear 64 which carries spring pin 65. In swinging the hopper extension 58 to the upright position for the jar 61, the spaced ears 63, 64, ride astride lug 66 fixed on the housing 45 and the pin 65 enters seat 67 for effecting a yieldable retention of the jar 61 in the bottom up position.

The maximum clearance for the two burr disks 47, 51, may be readily set for determining a maximum coarseness in the grinding. Such adjustment is easily effected by manipulation of hand wheel 68. This hand wheel 68 is connected by pin 69 (Fig. 4) with extension 70 concentric one way from grooved collar 71 which has threaded stem extension therebeyond. Wing-screw 72 in the bearing 7, fixes the collar 71 against any axial shifting. The threaded stem 73 is in cap nut 74. Radial pin 75 from the nut 74 rides in slot or way 76 of the housing 35 extending into the sleeve 7. This nut 74 is thus held against rotation, but may be thrust or retracted by the stem 73 toward or from the shaft 40.

Screws 77 in the housing section 35 mount depending arm 78 terminating in forward offset 79 mounting guide 80 for rod 81. This rod 81 upwardly extends through helical compression spring 82 to seat 83 and thrusts glass 84 or other vessel toward flat plate 85 as surrounding the discharge opening 49 from the mill. Set screw 86 locks the mill to the bracket sleeve 7.

In use, snapping on of the switch 13, for an interval, makes available for use, a tool carried by the shaft 18, or an article of equipment to be actuated thereby. This use may occur with or without disconnecting the mill. However, if it be desired that the coffee supply is to be fresh ground only for a meal at a time, then it would be in order to have the clutch for the mill in the disconnected position of Fig. 6.

For grinding coffee beans up into a desired degree of fineness, even approaching pulveriza- tion, the hand wheel 68 may set the nut 75 to hold the burr 47 against material receding away from the disk 51. The upright jar 61 has its reserve of coffee beans flow by gravity into the hopper 56. Connecting the clutch to the position shown in Fig. 7, the conveyor scroll 54, forces the beans to the burrs for axial feed and peripheral discharge to be worked by the deflector vane 48 toward the outlet 49. A glass 84 is readily placed to receive the discharge 87. When the desired quantity is ground, the switch 13 may be shut off, the mill stops. By depressing the cup 84 against the action of the spring 82, there is clearance for removing the cup and placing the freshly ground coffee in the coffee pot or percolator.

What is claimed and it is desired to secure by Letters Patent is:

A hopper for a mill comprising a first section, a bearing at the hopper first section, a second section hopper extension hinged at the bearing to swing from position over the hopper first section, said extension having a screw thread seat terminus, a third hopper section screw-thread-throat jar for a charge of material to be ground, said jar being connectible at said seat as rocked away from delivery position for there gravity-retaining said charge as being connected and rockable therefrom with the extension into hopper supply position for gravity discharge position into the hopper first section, and a catch at the hopper first section for retaining the extension and jar in hopper first section supply position for the mill.

NOBLE W. HARTMAN.